United States Patent
Cai et al.

(10) Patent No.: US 10,723,905 B2
(45) Date of Patent: Jul. 28, 2020

(54) BINDER COMPOSITION AND COATING COMPOSITION MADE THEREOF

(71) Applicant: Rohm and Haas Company, Philadelphia, PA (US)

(72) Inventors: Qiaoqiao Cai, Shanghai (CN); Tingke Zhang, Shanghai (CN); Alvin M. Maurice, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 30 days.

(21) Appl. No.: 15/024,142

(22) PCT Filed: Oct. 10, 2013

(86) PCT No.: PCT/CN2013/084946
§ 371 (c)(1),
(2) Date: Mar. 23, 2016

(87) PCT Pub. No.: WO2015/051515
PCT Pub. Date: Apr. 16, 2015

(65) Prior Publication Data
US 2016/0237300 A1  Aug. 18, 2016

(51) Int. Cl.
*C09D 131/04* (2006.01)
*C08F 218/08* (2006.01)
*C08L 5/16* (2006.01)

(52) U.S. Cl.
CPC .......... *C09D 131/04* (2013.01); *C08F 218/08* (2013.01); *C08L 5/16* (2013.01)

(58) Field of Classification Search
CPC .......... C08L 31/04; C08L 5/16; C09D 131/04
See application file for complete search history.

(56) References Cited

U.S. PATENT DOCUMENTS

| | | | |
|---|---|---|---|
| 5,087,487 A | 2/1992 | Katz et al. | |
| 5,137,571 A | 8/1992 | Eisenhart et al. | |
| 5,760,129 A | 6/1998 | Lau | |
| 6,472,462 B1 | 10/2002 | Kohlhammer et al. | |
| 6,812,278 B2 * | 11/2004 | Harris | C09B 67/0063 523/305 |
| 7,357,949 B2 | 4/2008 | Trogolo et al. | |
| 7,579,081 B2 | 8/2009 | Brown | |
| 2003/0018121 A1 | 1/2003 | Weitzel et al. | |
| 2010/0167609 A1 | 7/2010 | McLennan et al. | |
| 2010/0167610 A1 | 7/2010 | McLennan et al. | |
| 2011/0288209 A1 * | 11/2011 | Beck | C09D 7/45 524/90 |
| 2013/0203927 A1 | 8/2013 | Van Boxtel et al. | |

FOREIGN PATENT DOCUMENTS

WO  2010074865 A1  7/2010

* cited by examiner

*Primary Examiner* — Wenwen Cai
(74) *Attorney, Agent, or Firm* — Karl E. Stauss; Cantor Colburn LLP

(57) ABSTRACT

A new binder composition comprising, by dry weight based on the total dry weight of the binder composition, i) from 93% to 99.96% of polymer particles comprising, as polymerized units, by dry weight based on the total weight of the polymer particles, from 25% to 95% of a vinyl acetate; and from 5% to 75% of a vinyl ester of versatic acid and/or a vinyl ester of 2-ethyl hexanoic acid; and ii) from 0.04% to 7% of a low water soluble cyclodextrin.

9 Claims, No Drawings

BINDER COMPOSITION AND COATING COMPOSITION MADE THEREOF

FIELD OF THE INVENTION

The present invention relates to a binder composition and a coating composition made thereof with reduced odor and volatile organic compounds (VOC) release.

INTRODUCTION

Binders are commonly used in interior and exterior wall coatings. Low VOC and low odor binder and coating products are desired in the industry. For wall coating applications, vinyl acetate comprised binder is widely used, especially in interior wall coating for its inexpensiveness and relatively low VOC impurities except acetic acid and low odor.

Vinyl ester of versatic acid incorporated vinyl acetate binder has improved performances, such as water and alkali resistance, UV resistance, and stain repellency.

More and more coatings involve both vinyl acetate and vinyl ester of versatic acid these days. However, vinyl ester of versatic acid is a compound with smelly odor and is volatile into the air. The odor and its release into the air are very hard to be overcome since compounds of vinyl ester of versatic acid have high boiling points.

It is therefore still desired in the technical art for coating composition made of compounds of vinyl ester of versatic acid with reduced odor and volatile organic compounds (VOC) release. It is also desired that this binder composition is a vinyl ester of versatic acid-based binder.

SUMMARY OF THE INVENTION

The present invention provides a binder composition comprising, by dry weight based on the total dry weight of the binder composition, i) from 93% to 99.96% of polymer particles comprising, as polymerized units, by dry weight based on the total weight of the polymer particles, from 25% to 95% of a vinyl acetate; and from 5% to 75% of a vinyl ester of versatic acid and/or a vinyl ester of 2-ethyl hexanoic acid; and ii) from 0.04% to 7% of a low water soluble cyclodextrin.

In a preferred embodiment, the polymer particles further comprise, as polymerized units, from 0.1% to 50% by dry weight based on the total dry weight of the polymer particles, of (meth)acrylate monomers.

In a preferred embodiment, the polymer particles further comprise, as polymerized units, from 0.01% to 2% by dry weight based on the total dry weight of the polymer particles, of a stabilizer monomer.

In a preferred embodiment, the binder composition further comprises, from 0.01% to 5% by dry weight based on the total dry weight of the polymer particles, of a colloidal stabilizer.

The present invention further provides a coating composition comprising the binder composition.

DETAILED DESCRIPTION OF THE INVENTION

The binder composition of the present invention comprises, by dry weight based on the total dry weight of the binder composition, from 93% to 99.96%, preferably from 97% to 99.94%, and more preferably from 98% to 99.92%, of polymer particles; from 0.04% to 7%, preferably from 0.06% to 3%, and more preferably from 0.08% to 2%, of a low water soluble cyclodextrin.

Polymer Particles

The polymer particles comprises, as polymerized units, by dry weight based on the total dry weight of the polymer particles, from 25% to 95%, preferably from 40% to 80%, and more preferably from 55% to 70%, of a vinyl acetate; and from 5% to 75%, preferably from 10% to 50%, and more preferably from 15% to 30%, of a vinyl ester of versatic acid and/or a vinyl ester of 2-ethyl hexanoic acid.

The vinyl ester of versatic acid is a compound having a formula (I):

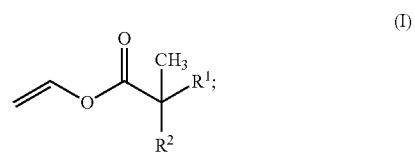

wherein $R^1$ or $R^2$ is each independently $C_1$-$C_{10}$ alkyl. Suitable examples include the formula (I) compound with $R^1$ and $R^2$ being alkyl groups each containing a total of 6 carbon atoms, and the formula (I) compound with $R^1$ and $R^2$ being alkyl groups each containing a total of 7 carbon atoms, respectively as commercially available under the trademarks of VEOVA™ 10, and VEOVA 9 from Momentive Specialty Chemicals Management (Shanghai) Co., Ltd.

The vinyl ester of 2-ethyl hexanoic acid is a compound having a formula (II):

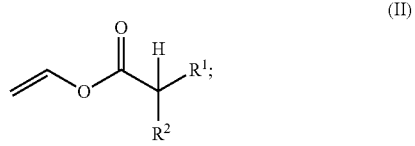

wherein $R^1$ is a $C_4$ alkyl, and $R^2$ is a $C_2$ alkyl. Suitable example is commercially available under the trademark of VEOVA EH from Momentive Specialty Chemicals Management (Shanghai) Co., Ltd.

In a preferred embodiment, the polymer particles of the present invention further comprises, as polymerized units, from 0.1% to 50%, preferably from 1% to 30%, and more preferably from 5% to 20%, by dry weight based on the total dry weight of the polymer particles, of (meth)acrylate monomers.

Suitable examples of the (meth)acrylate monomers include butyl (meth)acrylate, ethylhexyl (meth)acrylate, ethyl (meth)acrylate, methyl methacrylate, n-heptyl (meth)acrylate, n-octyl (meth)acrylate, n-nonyl (meth)acrylate, n-decyl (meth)acrylate, stearyl (meth)acrylate, lauryl (meth)acrylate, maleic anhydride, and acrylonitrile.

In a preferred embodiment, the polymer particles further comprise, as polymerized units, from 0.01% to 2%, preferably from 0.05% to 1.5%, and most preferably from 0.1% to 1%, by dry weight based on the total dry weight of the polymer particles, of a stabilizer monomer.

In a preferred embodiment, the binder composition further comprises, from 0.01% to 5%, preferably from 0.05% to 3%, and most preferably from 0.1% to 2%, by dry weight based on the total dry weight of the polymer particles, of a colloidal stabilizer.

Suitable examples of the colloidal stabilizer include hydroxyethyl cellulose (HEC) and its derivatives, and polyvinyl alcohol (PVOH).

Suitable examples of the stabilizer monomer include sodium styrene sulfonate (SSS), sodium vinyl sulfonate (SVS), 2-acrylamido-2-methylpropanesulfonic acid (AMPS), acrylamide (AM), acrylic acid (AA), methylacrylic acid (MAA), and itaconic acid (IA).

The polymerization of the polymer particles can be any method known in the art, including emulsion polymerization, mini-emulsion polymerization, and mechanical dispersing technology. Suitable examples of polymerization process include those disclosed in U.S. Pat. No. 7,579,081 B2, U.S. Pat. No. 7,357,949 B2 and WO 2010074865 A1.

Low Water Soluble Cyclodextrin

The low water soluble cyclodextrins used in the present invention may be any of the known cyclodextrins containing from six to twelve glucose units, e.g., alpha-cyclodextrin, beta-cyclodextrin, gamma-cyclodextrin, and their derivatives such as ethyl-beta-cyclodextrin, acetyl-beta-cyclodextrin, triacetyl-beta-cyclodextrin, and tert-butyl-beta-cyclodextrin, and the mixtures thereof.

Preferred examples are beta-cyclodextrin and its derivatives.

Coating Composition—Pigments and Extenders

The binder composition of the present invention can be made into a coating composition by addition of pigments, extenders, and additives into the binder composition.

Pigments of the present invention are typically inorganic pigment particles, and preferably particulate inorganic materials which are capable of materially contributing to the opacity or hiding capability of a coating. Such materials typically have a refractive index of equal to or greater than 1.8 and include titanium dioxide ($TiO_2$), zinc oxide, zinc sulfide, barium sulfate, and barium carbonate. Titanium dioxide ($TiO_2$) is preferred.

Extenders are typically a particulate inorganic materials having a refractive index of less than or equal to 1.8 and greater than 1.3 and include calcium carbonate, clay, calcium sulfate, aluminosilicate, silicate, zeolite, mica, diatomaceous earth, solid or hollow glass, and ceramic bead.

Coating Composition—Additives

The coating composition of the present invention may further contain at least one conventional coating additives such as coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, colorants, flowing agents, crosslinkers, and anti-oxidants. The uses of these additives are known in the art.

Preparation of the Coating Composition

The preparation of the coating composition involves the process of selecting and admixing appropriate coating ingredients in the correct proportions to provide a coating with specific processing and handling properties, as well as a final dry coating film with the desired properties.

Application of the Coating Composition

The coating composition may be applied by conventional application methods such as brushing, roller application, and spraying methods such as air-atomized spray, air-assisted spray, airless spray, high volume low pressure spray, and air-assisted airless spray.

Suitable substrates include concrete, cement board, medium-density fiberboard (MDF) and particle board, gypsum board, wood, stone, metal, plastics, wall paper and textile, etc. Preferably, all the substrates are pre-primed by waterborne or solvent borne primers.

EXAMPLES

I. Raw Materials

TABLE 1a

| Compound | Company |
| --- | --- |
| DISPONIL ™ FES-32 surfactant (FES-32) | BASF Chemical Co., Ltd. |
| ECOSURF ™ SA-9 surfactant (SA-9) | The Dow Chemical Company |
| CELLOSIZE ™ QP-3L stabilizer (QP-3L) | The Dow Chemical Company |
| TERGITOL ™ 15-S-40 surfactant (15-S-40) | The Dow Chemical Company |
| VEOVA ™ 10 monomer (VEOVA 10) | Momentive Specialty Chemicals Management (Shanghai) Co., Ltd. |
| SILQUEST ™ A-171 Cross-linker (A-171) | Momentive Specialty Chemicals Management (Shanghai) Co., Ltd. |
| PRIMAL ™ E-1476 binder (E-1476) | The Dow Chemical Company |
| TEGO ™ Foamex 825 deformer | Evonik Degussa (China) Co., Ltd. |
| KATHON ™ LXE biocide | The Dow Chemical Company |
| NOPCO ™ NDW defoamer | San Nopco Ltd. |

TABLE 1b

| | Abbreviation |
| --- | --- |
| Compound | Chemical description |
| SVS | sodium vinyl sulfonate |
| SSS | sodium styrene sulfonate |
| AMPS | 2-acrylamido-2-methylpropanesulfonic acid |
| BA | butyl acrylate |
| VA | vinyl acetate |
| ST | styrene |
| AM | acrylamide |
| MAA | methylacrylic acid |
| AA | acrylic acid |
| IA | itaconic acid |
| SPS | sodium persulfate |
| IAA | isoascorbic acid |
| SBS | sodium bisulfite |
| t-BHP | t-butyl hydroperoxide |
| EDTA | ethylenediaminetetraacetic acid |
| β-CD | beta-cyclodextrin |

II. Test Procedures

Total VOC Detection (According to Chinese Standard GB 18582-2008)

The quantitative and qualitative analysis of the binder and coating samples is performed on an Agilent 7890-5975C Gas Chromatograph-Mass Spectrometer (Agilent technologies).

An aliquot of 2 g (recorded accurately) homogenized sample was weighted into a 20 ml centrifuge vial. An acetonitrile solvent solution was added to the vial and their exact weights were recorded. The acetonitrile solution comprised 5000 ppm 2(2-ethoxyethoxy)ethanol by weight as the internal standard, and 1000 ppm ethyl oxalate by weight as the VOC marker. The vial was vortex centrifuged, shook for 1 min, and held for 5 mins, then was vortex centrifuged again and shook for 1 min to mix the sample with the markers. The vial was then vortex centrifuged at 4000 rpm for 20 mins. The supernatant of the mixture was taken out and filtered through a 0.45 um syringe filter. The filtration was then injected into the Agilent 7890-5975C Gas Chromatograph-Mass Spectrometer. The injection volume was 1 μl.

Odor Detection

The odor detection test was conducted by naked noses of 8 panelists. Average value was recorded.

III. Examples

Dispersions of Polymer Particles

Dispersion 1

A monomer emulsion was prepared by first mixing 336.11 g DI water, 55.17 g A-102, and 23.66 g 15-S-40, and followed by adding 13.26 g SVS, 1310.70 g VA, 331 g VEOVA10, 16.71 g acrylamide, and 690 g DI water. The emulsion was charged to a 5 L 4-neck round bottom flask equipped with a mechanical stirrer, a nitrogen gas blanket, a thermometer, a condenser, a heating mantel and a temperature controller. The contents of the flask were heated to 81° C. under a nitrogen atmosphere. 10 g $FeSO_4 \cdot 7H_2O$ (0.2 wt %), 2.1 g EDTA (1%), 3.75 g SPS in 21 g DI water and 80.90 g E-1476 were added to the stirred flask. The flask was rinsed with 30 g DI water. The monomer emulsion, the solution of 3.75 g SPS dissolved in 70.46 g DI water and the solution of 0.80 g IAA and 2.00 g sodium acetate dissolved in 70.46 g DI water were then added to the flask over 180 minutes. Reaction temperature was maintained at 75° C. Next, 38 g DI water was used to rinse the emulsion feed line to the flask. After the contents of the flask were cooled to 70° C., 1.18 g t-BHP in 7.00 g DI water, and 1.18 g IAA in 30 g DI water were added to the flask. The flask was held for 10 minutes. The flask temperature was cooled to 65° C., then 0.71 g t-BHP in 7 g DI water, and 0.71 g IAA in 19 g DI water were added to the flask. The flask was held for 10 minutes. Before the flask temperature was approaching 60° C., 0.71 g t-BHP in 7 g DI water, and 0.71 g IAA in 19 g DI water were added to the flask. The flask was hold for 10 minutes.

When the flask temperature was cooled to lower than 50° C., the contents of the flask were neutralized to a pH of 4.64 by adding 27.56 g NaOH solution (5.66 wt %). After the solution of 10.86 g KATHON™ LXE biocide in 8 g DI water and 1.00 g NOPCO™ NDW defoamer were added to the flask. The gel was removed by filter and the resulting dispersion had a 52.31% solid and a 366 nm particle size.

Dispersion 2

In a similar procedure as in preparing dispersion 1, dispersion 2 was prepared from a monomer mixture containing 1244.19 g VA, 416.40 g VEOVA 10, and 10.88 g SVS. The resulting dispersion 2 had a 57.31 wt % solid and a 402 nm particle size.

Dispersion 3

In a similar procedure as in preparing dispersion 1, dispersion 3 was prepared from a monomer mixture containing 978.03 g VA, 662 g VEOVA 10, 13.26 g SVS and 16.71 g acrylamide. The resulting dispersion 3 had a 52.52 wt % solid and a 360 nm particle size.

The compositions of the dispersions were summarized in Table 2.

TABLE 2

| | monomers (dry weight % based on the total dry weight of the polymer particles) | | | |
|---|---|---|---|---|
| Dispersion | VA | VEOVA 10 | SVS | AM |
| 1 | 78.8 | 20 | 0.2 | 1 |
| 2 | 74.7 | 25 | 0.3 | N/A |
| 3 | 58.8 | 40 | 0.2 | 1 |

Binder Compositions

Binder 1

0.191 wt % β-CD was slowly added to dispersion 1 under agitation to prepare the binder composition 1, and the prepared binder 1 was tested for total VOC.

Binders 2-9

Binders 2-9 were prepared in a similar procedure of preparing binder 1, except that the β-CD loadings were different and were listed in Table 3.

Binders 1-9 were adjusted to the same solid content with DI water before VOC test.

Binders 1-3 were made into coatings 1-3 using common formulations and coatings 1-3 were tested for odor release.

The binder compositions were shown in Table 4.

TABLE 4

| Binder | Dispersion | β-CD, weight % based on the total dry weight of the polymer particles | VOC, ppm (μg/g) | Odor of binders | Odor of coatings[i] |
|---|---|---|---|---|---|
| 1 | 1 | 0.191 | 3147 | lower than odor of binder 2 | lower than odor of coating 2 |
| 2 | 1 | 0.038 | 8561 | lower than odor of binder 3 | lower than odor of coating 3 |
| 3* | 1 | 0 | 11373 | odor of binder 3 | odor of coating 3 |
| 4 | 2 | 1.745 | 99 | lower than odor of binder 5 | — |
| 5 | 2 | 0.872 | 146 | lower than odor of binder 6 | — |
| 6* | 2 | 0 | 222 | odor of binder 6 | — |
| 7 | 3 | 1.904 | 1215 | lower than odor of binder 8 | — |
| 8 | 3 | 0.952 | 1716 | lower than odor of binder 9 | — |
| 9* | 3 | 0 | 2200 | odor of binder 9 | — |

[i]The coatings were prepared with 30% latex loading and 70% Zero-VOC millbase.
*Comparative examples.

The results in the above table indicate that, binders 1 and 2 compared to binder 3, binders 4 and 5 compared to binder 6, and binders 7 and 8 compared to binder 9, had higher β-CD loadings, and therefore lower VOC and odor.

What is claimed is:

1. A binder composition comprising, by dry weight based on total dry weight of the binder composition, a blend of
   i) from 93% to 99.96% of polymer particles consisting of, as polymerized units, by dry weight based on the total weight of the polymer particles,
   from 40% to 80% of a vinyl acetate;

from 10% to 50% of a vinyl ester of versatic acid and/or a vinyl ester of 2-ethyl hexanoic acid; and from 0.01% to 2% of a combination of sodium vinyl sulfonate (SVS) and acrylamide (AM); and ii) from 0.04% to 7% of a low water soluble cyclodextrin selected from the group consisting of alpha-cyclodextrin, beta-cyclodextrin, gamma-cyclodextrin, derivatives of alpha-, beta-, or gamma-cyclodextrin, and combinations thereof;

wherein the vinyl ester of versatic acid is a compound having a formula (I):

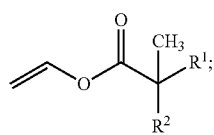

(I)

wherein $R^1$ or $R^2$ is each independently $C_1$-$C_{10}$ alkyl; and the vinyl ester of 2-ethyl hexanoic acid is a compound having a formula (II):

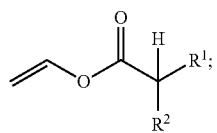

(II)

wherein $R^1$ is a $C_4$ alkyl, and $R^2$ is a $C_2$ alkyl.

2. The binder composition according to claim 1 wherein $R^1$ and $R^2$ of formula (I) are alkyl groups containing a total of 6 carbon atoms, or are alkyl groups containing a total of 7 carbon atoms.

3. The binder composition according to claim 1 wherein the low water soluble cyclodextrin is beta-cyclodextrin or its derivatives.

4. The binder composition according to claim 1 wherein it further comprises, from 0.01% to 5% by dry weight based on the total dry weight of the polymer particles, of a colloidal stabilizer.

5. The binder composition according to claim 1 wherein $R^1$ and $R^2$ of formula (I) are alkyl groups containing a total of 6 carbon atoms, or are alkyl groups containing a total of 7 carbon atoms.

6. The binder composition according to claim 1 wherein the low water soluble cyclodextrin is beta-cyclodextrin, and wherein the composition has a lower odor than the composition not containing the low water soluble cyclodextrin.

7. The binder composition according to claim 1 wherein the stabilizer monomer is sodium vinyl sulfonate (SVS).

8. The binder composition according to claim 4 wherein the colloidal stabilizer is selected from the group consisting of hydroxyethyl cellulose (HEC) and its derivatives, and polyvinyl alcohol (PVOH).

9. A coating composition comprising the binder composition according to claim 1.

* * * * *